United States Patent
Utsumi

(10) Patent No.: US 8,347,305 B2
(45) Date of Patent: Jan. 1, 2013

(54) ALLOCATION OF STORAGE UNITS FOR EXECUTION OF APPLICATION PROGRAMS

(75) Inventor: Keiko Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 12/399,824

(22) Filed: Mar. 6, 2009

(65) Prior Publication Data

US 2009/0235271 A1    Sep. 17, 2009

(30) Foreign Application Priority Data

Mar. 12, 2008 (JP) ................................. 2008-062782

(51) Int. Cl.
G06F 9/46 (2006.01)
(52) U.S. Cl. ........................................................ 718/104
(58) Field of Classification Search .................. 718/105, 718/104
See application file for complete search history.

(56) References Cited

U.S. PATENT DOCUMENTS

| 7,227,746 | B2 * | 6/2007 | Tanaka et al. | 361/679.33 |
| 2003/0033486 | A1 * | 2/2003 | Mizrachi et al. | 711/133 |
| 2005/0086632 | A1 * | 4/2005 | Oyama | 717/100 |
| 2008/0077929 | A1 * | 3/2008 | Clohessy et al. | 718/104 |

FOREIGN PATENT DOCUMENTS

| EP | 1505502 | * | 8/2003 |
| JP | 09-244958 A | | 9/1997 |
| JP | 2003-196110 A | | 7/2003 |
| JP | 2006-259873 A | | 9/2006 |

* cited by examiner

Primary Examiner — Meng An
Assistant Examiner — Blake Kumabe
(74) Attorney, Agent, or Firm — Canon USA Inc IP Division

(57) ABSTRACT

A CPU executes initialization for allocating a storage area of an auxiliary storage device for a program execution area after a particular application program is loaded into the program execution area and becomes executable. Subsequently, the CPU loads a plurality of application programs into the program execution area.

10 Claims, 10 Drawing Sheets

FIG.4

| TYPE OF APPLICATION PROGRAM | START-UP SETTING | STORAGE CAPACITY NECESSARY FOR EXECUTING APPLICATION PROGRAM |
|---|---|---|
| APPLICATION PROGRAM A (NETWORK FUNCTION EXECUTION PROGRAM) | 2: START AFTER START OF OS | 128 MB |
| APPLICATION PROGRAM B (HDD BACK-UP PROGRAM) | 2: START AFTER START OF OS | 16 MB |
| APPLICATION PROGRAM C (SCAN FUNCTION EXECUTION PROGRAM) | 1: START AT THE TIME OF START OF OS | 128 MB |
| APPLICATION PROGRAM D (PRINT FUNCTION EXECUTION PROGRAM) | 1: START AT THE TIME OF START OF OS | 128 MB |
| APPLICATION PROGRAM E (OPERATION UNIT FUNCTION EXECUTION PROGRAM) | 1: START AT THE TIME OF START OF OS | 128 MB |
| ⋮ | ⋮ | ⋮ |
| APPLICATION PROGRAM N | 3: DOES NOT START | 64 MB |

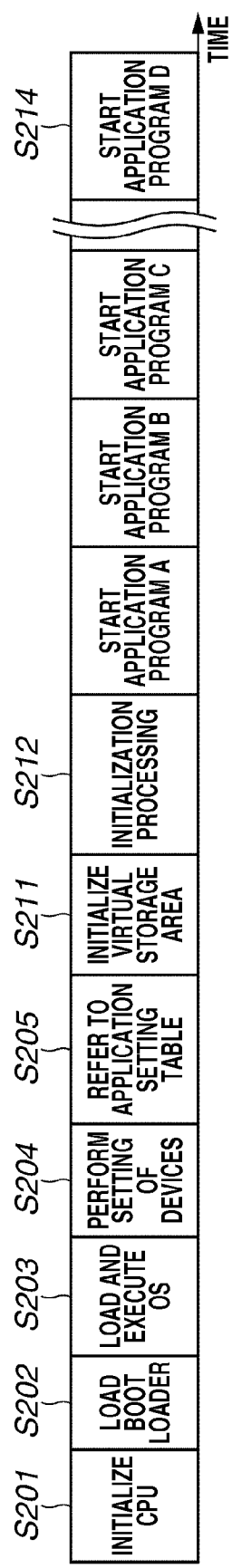

ALLOCATION OF STORAGE UNITS FOR EXECUTION OF APPLICATION PROGRAMS

BACKGROUND OF THE INVENTION

1. Field of the Invention

The present invention relates to an information processing apparatus and an information processing method.

2. Description of the Related Art

Conventionally, a static memory allocation scheme has been widely used as a memory allocation scheme for information processing apparatuses. In the static memory allocation scheme, an entire program is loaded into a main storage device such as a random access memory (RAM) from an auxiliary storage device such as a hard disk. Then, the program is executed in the main storage device.

In recent times, operating systems employed in the information processing apparatuses support a virtual memory system. A most commonly-used virtual memory system is a paging system. Operating systems such as Windows® and Linux® employ the paging system as a memory allocation scheme.

According to the paging, which is discussed in Japanese Patent Application Laid-Open No. 9-244958, a physical storage area and a virtual storage area are divided into pages having a certain fixed-length of memory (for example, 4 kilobytes) and a relation between the physical storage area and the virtual storage area is mapped by a page table. The physical storage area includes the physical storage area of the main storage device as well as the physical storage area of the auxiliary storage device. The page table is used for managing a plurality of physical storage areas, which are divided into the main storage device and the auxiliary storage device, as a single virtual storage area.

According to the paging, instead of a whole of the file or the execution program, only a part of a file or an execution program is located in the physical storage area of the main storage device. When a page in the virtual storage area is accessed by an application program, if the accessed page is not allocated in the physical storage area of the main storage device, then a page fault occurs. In this case, the operating system starts a page-in process. In the page-in process, a page stored in a physical storage area of an auxiliary storage device is read based on the page table.

When the page-in process is started, the operating system searches for a free page in the physical storage area of the main storage device. If the operating system finds the free page, the operating system loads the program which has been read out from the auxiliary storage device into the free page. After updating the page table, the operating system returns to the normal process and executes the program in the virtual storage area.

An information processing apparatus which supports the virtual memory system can execute a program regardless of the storage capacity of the main storage device. Thus, such an information processing apparatus is advantageous when concurrently executing a great number of application programs on the operating system. However, when the information processing apparatus is started, if the virtual storage area includes the physical storage area of the main storage device and the physical storage area of the auxiliary storage device, initialization of the virtual storage area will take time. The initialization is performed, for example, by writing a predetermined value, such as 0, in the physical storage area included in the virtual storage area. If a great number of application programs is to be concurrently executed on the operating system of the information processing apparatus, it is useful if an area larger then the physical storage area of the main storage device is reserved as the physical storage area of the auxiliary storage device.

On the other hand, it is useful for an operator of the information processing apparatus if standby time (start-up time) is short. The standby time is time from when power is supplied to the information processing apparatus and the apparatus is activated, to when the apparatus becomes capable of executing some type of application program.

SUMMARY OF THE INVENTION

The present invention is directed to a method for concurrently executing a plurality of application programs regardless of a storage capacity of a main storage device in an information processing apparatus as well as reducing standby time of the information processing apparatus. The standby time is time from when the information processing apparatus is activated, to when the apparatus becomes capable of executing a particular application program.

According to an aspect of the present invention, an information processing apparatus that executes a plurality of application programs that run on an operating system, includes a first storage unit including a first storage area, a second storage unit including a second storage area, an initialization unit configured to execute initialization for allocating at least the first storage area for a program execution area of the application programs, a loading unit configured to load the application programs into the program execution area; and an execution unit configured to execute the application programs loaded into the program execution area by the loading unit. The initialization unit executes initialization for allocating the second storage area for the program execution area after a particular application program included in the a plurality of application programs is loaded into the program execution area by the loading unit and becomes executable, and the loading unit loads the particular application program into the program execution area after the first storage area is allocated for the program execution area by the initialization unit, and loads an application program different from the particular application program into the program execution area after the second storage area is allocated for the program execution area by the initialization unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of an application setting table.

FIG. 10 is a timing chart illustrating details of processes executed by the CPU, which proceeds with time.

DETAILED DESCRIPTION OF THE EMBODIMENTS

Various exemplary embodiments, features, and aspects of the invention will be described in detail below with reference to the drawings.

Figure 1:
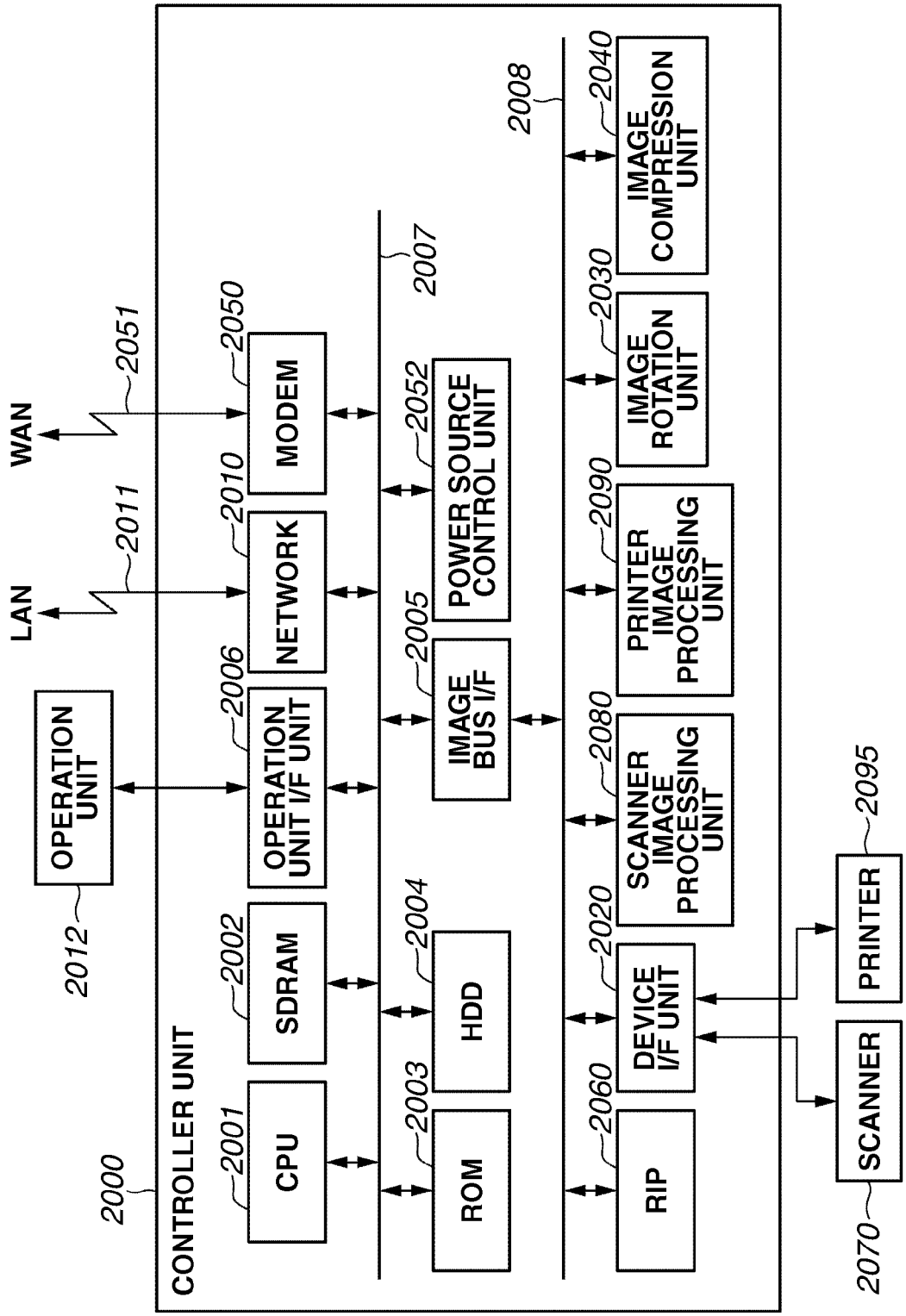
FIG. 1 is a block diagram illustrating a configuration of an information processing apparatus according to an exemplary embodiment of the present invention.

FIG. 1 is a block diagram illustrating a configuration of an information processing apparatus according to a first exemplary embodiment of the present invention.

In FIG. 1, a controller unit (CU) 2000 is connected to a scanner 2070, which is an image input device and a printer 2095, which is an image output device. The CU 2000 is also connected to a local area network (LAN) 2011 and a wide area network (WAN) 2051. Via the LAN 2011 and the WAN 2051, the CU 2000 inputs/outputs image information and device information.

Further, the CU 2000 includes a power source control unit 2052 used for controlling a power source (not shown). The information processing apparatus is switched from, for example, a print mode to a power-saving mode and vice versa by the power source control unit 2052.

A CPU 2001 is a controller configured to control the CU 2000. A synchronous dynamic random access memory (SDRAM) 2002 is a system work memory, which the CPU 2001 uses when the CPU 2001 executes a program. Additionally, the SDRAM 2002 serves as an image memory used for temporarily storing image data. A read-only memory (ROM) 2003 functions as a boot ROM. A boot program (initialization program), which is used when the CPU 2001 initializes each unit in the CU 2000, is stored in the ROM 2003. The boot program includes a boot loader used for loading an operating system and a plurality of application programs stored in a hard disk drive (HDD) 2004 into a storage area of the SDRAM 2002. The boot program can be stored in the HDD 2004 in place of the ROM 2003.

The HDD 2004 is configured to store the operating system executed by the CPU 2001 and the plurality of application programs run on the operating system by the CPU 2001. The operating system and the plurality of application programs are stored in a storage area different from a physical storage area 804 which is used as a virtual storage area. While the operating system and the plurality of application programs are stored in the HDD 2004 according to the present exemplary embodiment, the present invention is not limited to such an example. For example, the operating system and the plurality of application programs can be stored in a non-volatile storage medium different from the HDD 2004.

An operation unit I/F unit 2006 functions as an interface unit for an operation unit 2012. Image data which is to be displayed on the operation unit 2012 is input to the operation unit 2012 via the operation unit I/F unit 2006. Additionally, the operation unit I/F unit 2006 transmits information, which has been input by the operator of the information processing apparatus using the operation unit 2012, to the CPU 2001.

A network unit 2010 is connected to the LAN 2011. Via the LAN 2011, the network unit 2010 receives data sent from an external apparatus and transmits data to the external apparatus.

A modem unit 2050 is connected to the WAN 2051. Via the WAN 2051, the modem unit 2050 receives facsimile data sent from an external apparatus and transmits facsimile data to the external apparatus. Each of the above-described units is mutually connected via a system bus 2007.

An image bus I/F unit 2005 connects the system bus 2007 and an image bus 2008 which transfers image data at a high speed. The image bus I/F unit 2005 serves as a bus bridge that converts data structure.

The image bus 2008 is based on the PCI (peripheral component interconnect) bus or the IEEE 1394. Devices described below are connected to the image bus 2008.

A raster image processor (RIP) unit 2060 is configured to perform image processing. The RIP unit 2060 rasterizes page description language (PDL) code, which is included in print data output from an external apparatus and input via the network unit 2010 into a bit-mapped image. A device I/F unit 2020 connects the CPU 2001 to an image input/output device such as the scanner 2070 or the printer 2095. The device I/F unit 2020 is used for synchronous/asynchronous conversion of the image data.

The scanner 2070 is used for reading an image formed on a document as an electric signal using an image sensor such as a charge-coupled device (CCD) and acquiring image data by an analog/digital conversion of the signal. The printer 2095 is used for printing an image on a sheet of paper, using developer such as toner, according to image data stored in the HDD 2004 or the like.

A scanner image processing unit 2080 is configured to perform image processing of the image data output from the scanner 2070, such as correcting, processing, and editing of the image data. A printer image processing unit 2090 corrects the image data to be printed, which is input via the image bus I/F unit 2005, and converts resolution of the image according to a capability of the printer 2095.

An image rotation unit 2030 is used for rotating the image data. An image compression unit 2040 is used for compressing/decompressing multivalued image data in JPEG format and binary image data in JBIG, MMR, or MH format.

The power source control unit 2052 is adapted to control the power source that supplies voltage to each of the units included in the CU 2000 as well as the scanner 2070 and the printer 2095 based on an instruction given by the CPU 2001. Further, when the information processing apparatus is in a power-saving mode, the power source control unit 2052 turns on the power to the CU 2000 according to a return factor derived from an outside device. The power source controlled by the power source control unit 2052 generates a direct current voltage based on an alternating voltage supplied from an external commercial power source. Further, a main switch is provided between the external commercial power source and the power source controlled by the power source control unit 2052. The operator of the information processing apparatus starts the information processing apparatus by turning on the main switch. Further, the operator of the information processing apparatus turns off the information processing apparatus by turning off the main switch.

Figure 2:
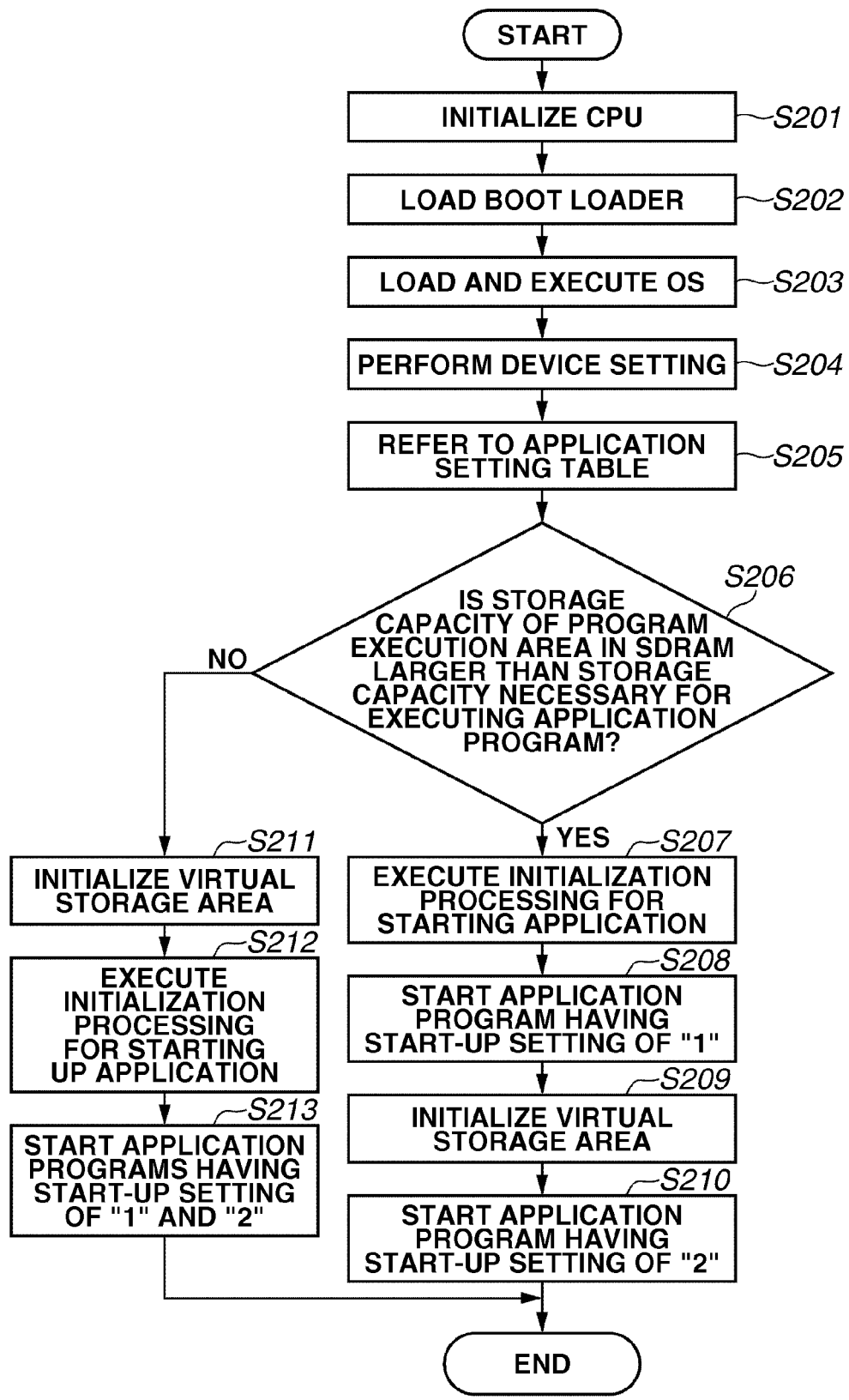
FIG. 2 is a flowchart illustrating flow of processing of a controller unit at the time of starting the information processing apparatus.
Figure 3:
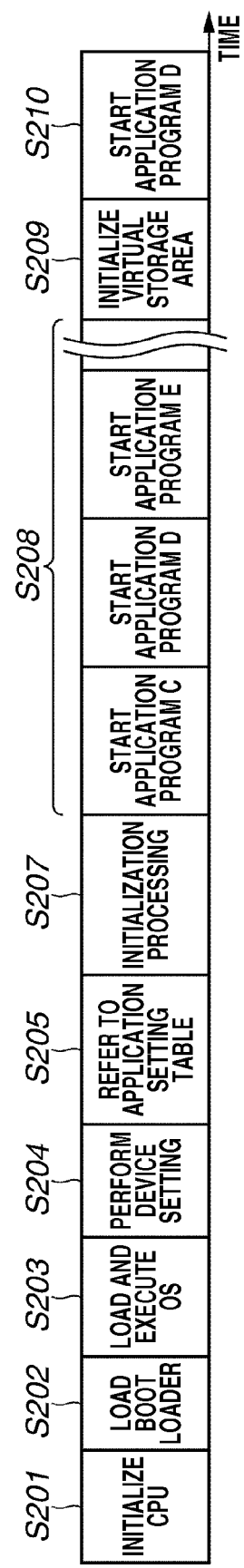
FIG. 3 is a timing chart illustrating details of processes executed by a central processing unit (CPU), which proceeds with time.

FIG. 2 is a flowchart illustrating flow of processing of the CU 2000 at a time of starting the information processing apparatus. FIG. 3 is a timing chart illustrating details of processes executed by the CPU 2001 that proceeds with time, which operates according to the flowchart illustrated in FIG. 2. The processing flow of the CU 2000 at a time of starting the information processing apparatus will now be described referring to FIGS. 2 and 3.

First, the start processing of the CU 2000 illustrated in the flowchart in FIG. 2 is activated when the main switch (not shown) is flipped by the operator of the information processing apparatus from the off to on.

In step S201, the CPU 2001 loads Basic Input/Output System (BIOS) into the SDRAM 2002 from the ROM 2003. Then, initialization of the CPU 2001 is performed.

If it is determined that data can be read from the ROM 2003 after the execution of the BIOS by the CPU 2001, in step S202, the CPU 2001 loads the boot loader from the ROM 2003 into the SDRAM 2002 and executes the boot loader.

In step S203, the CPU 2001 accesses the HDD 2004 by executing the boot loader. Then, the CPU 2001 acquires an operating system program (hereinafter referred to as an OS) stored in the HDD 2004 and loads it into the SDRAM 2002. Subsequently, the CPU 2001 executes the OS.

In step S204, by the execution of the OS, the CPU 2001 recognizes various types of devices included in the CU 2000 such as the network unit 2010 and the printer 2095, and makes settings of such devices. The OS allocates a physical storage area (a physical storage area 803 described below) of the SDRAM 2002 for an execution area of the application program.

In step S205, the OS executed by the CPU 2001 refers to an application setting table stored in the HDD 2004. An example of the application setting table is illustrated in FIG. 4.

FIG. 4 illustrates start-up settings about a number N of application programs stored in the HDD 2004 and a storage capacity necessary in executing each of the programs in a tabular form.

In FIG. 4, an application program A is a network function execution program and a program adapted to transmit and receive data to and from the external apparatus connected to the LAN 2011 via the network unit 2010. An application program B is a HDD backup program. According to the application program B, at least a part of the data stored in the HDD 2004 is transmitted to the external apparatus connected to the CU2000 via the LAN 2011 to back up the data stored in the HDD 2004.

Since the application program B requires a network function that is based on the network unit 2010, the application program B is executed on condition that the application program A is started. Further, an application program C is a scan function execution program. According to the application program C, image data output from the scanner 2070 is stored in the SDRAM 2002 via the device I/F unit 2020, and further, the image data stored in the SDRAM 2002 is stored in the HDD 2004.

An application program D is a print function execution program for transferring the image data stored in the HDD 2004 to the printer 2095 so that the printer 2095 can perform print processing of the image data on a sheet of paper according to the image data. According to the application program D, the image data stored in the HDD 2004 is once transferred to the SDRAM 2002, and transferred again to the printer 2095 via the device I/F unit 2020.

An application program E is an operation unit function execution program for transmitting the data input by the operator of the information processing apparatus using the operation unit 2012 to the CPU 2001 via the operation unit I/F unit 2006. When the OS executes the operation unit function execution program, the OS becomes capable of receiving instructions from the operator. If the OS receives the instructions from the operator, the OS becomes capable of executing the functions of other application programs.

For example, by accepting a setting condition (e.g., resolution, document size, or color or black-and-white) for executing the scanning function via the operation unit 2012, the application program E can cause the application program C to recognize a setting condition necessary in executing the scanning function. If the application program C recognizes the setting condition for executing the scanning function execution program, a scanning function based on the instruction given by the operator can be realized by using the recognized setting condition.

Further, for example, by accepting a setting condition (e.g., paper size, two-sided/one-sided printing) for executing the printing function via the operation unit 2012, the application program E can cause the application program D to recognize a setting condition necessary in executing the printing function. If the application program D recognizes the setting condition for executing the printing function execution program, a printing function based on the instruction given by the operator can be realized by using the recognized setting condition.

Further, the application setting table illustrated in FIG. 4 includes setting regarding start of each of the application programs. There are three types of start-up setting: "1", "2", and "3". If the start-up setting is "1" or "2", the OS starts the application program at the time of starting the OS. If the start-up setting is "1", the application program is started at least before step S209 (initialization of the virtual storage area) described below. If the start-up setting is "2", the application program is started at least after step S209 (initialization of the virtual storage area) described below. Further, if the start-up setting is "3", the OS does not start the application program at the time of starting the OS.

Additionally, a storage capacity which is necessary in executing each of the application programs is described in FIG. 4. If a storage capacity in FIG. 4 is not reserved as a program execution area by the OS, then the program cannot be executed.

Now, returning to FIG. 2, in step S205, the OS executed by the CPU 2001 refers to the application setting table in FIG. 4 and confirms the start-up setting and a storage capacity necessary in executing each of the application programs A through N. Details of the application setting table can be set by the OS. When the OS sets the setting of the application table, the OS executed by the CPU 2001 functions as a setting unit that sets start-up setting for each application program.

In step S206, the OS determines whether the storage capacity of the program execution area (i.e., a first storage area) in the SDRAM 2002 is larger than the storage capacity necessary in executing the application program. The program execution area of the SDRAM 2002 is an area reserved in the SDRAM for the execution of the application program by the OS. The program execution area is, for example, an area obtained by subtracting a storage capacity which the OS needs from a total storage capacity of the SDRAM 2002. The storage capacity necessary in executing the application programs is a total of the storage capacity necessary in executing the application programs having the start-up setting of "1" in FIG. 4. According to the table in FIG. 4, the storage capacity necessary in executing the application programs is 384 MB (128 MB+128 MB+128 MB). Since the storage capacity necessary in executing the application programs is 384 MB, if the program execution area of the SDRAM 2002 is larger than 384 MB (YES in step S206), then the process proceeds to step S207. If the program execution area of the SDRAM 2002 is not larger than 384 MB (NO in step S206), then the process proceeds to step S211.

In step S207, the OS executes initialization to start the application programs having the start-up setting of "1". The initialization is performed, for example, by writing a predetermined value such as 0 in the physical storage area which is configured as a virtual storage area. The initialization includes allocation processing of the physical storage area 803 in the main storage device as a program execution area of the application programs having the start-up setting of "1".

In step S208, the OS starts the application programs having the start-up setting of "1" (i.e., application programs C, D, and E according to the table in FIG. 4). To be more precise, the OS loads the application programs C, D, and E stored in the HDD 2004 into the SDRAM 2002. At this time, the CPU 2001 that executes the OS, functions as a loading unit that loads the application programs into the program execution area. Since the storage capacity necessary in executing the applications C, D, and E is not larger than the storage capacity of the program execution area reserved in the SDRAM 2002, the OS executes the applications C, D, and E using only the program execution area of the SDRAM 2002. It is to be noted that prior to executing the application programs C, D, and E, the OS loads at least each of the application programs into the program execution area of the SDRAM 2002.

In step S209, the OS initializes the virtual storage area so that the information processing apparatus can execute the application programs A and B as well as the application programs C through E. The initialization is performed, for example, by writing a predetermined value such as "0" in the physical storage area configured as the virtual storage area. The start of the application programs C through E is completed at the time the OS executes the initialization of the virtual storage area.

Figure 8:
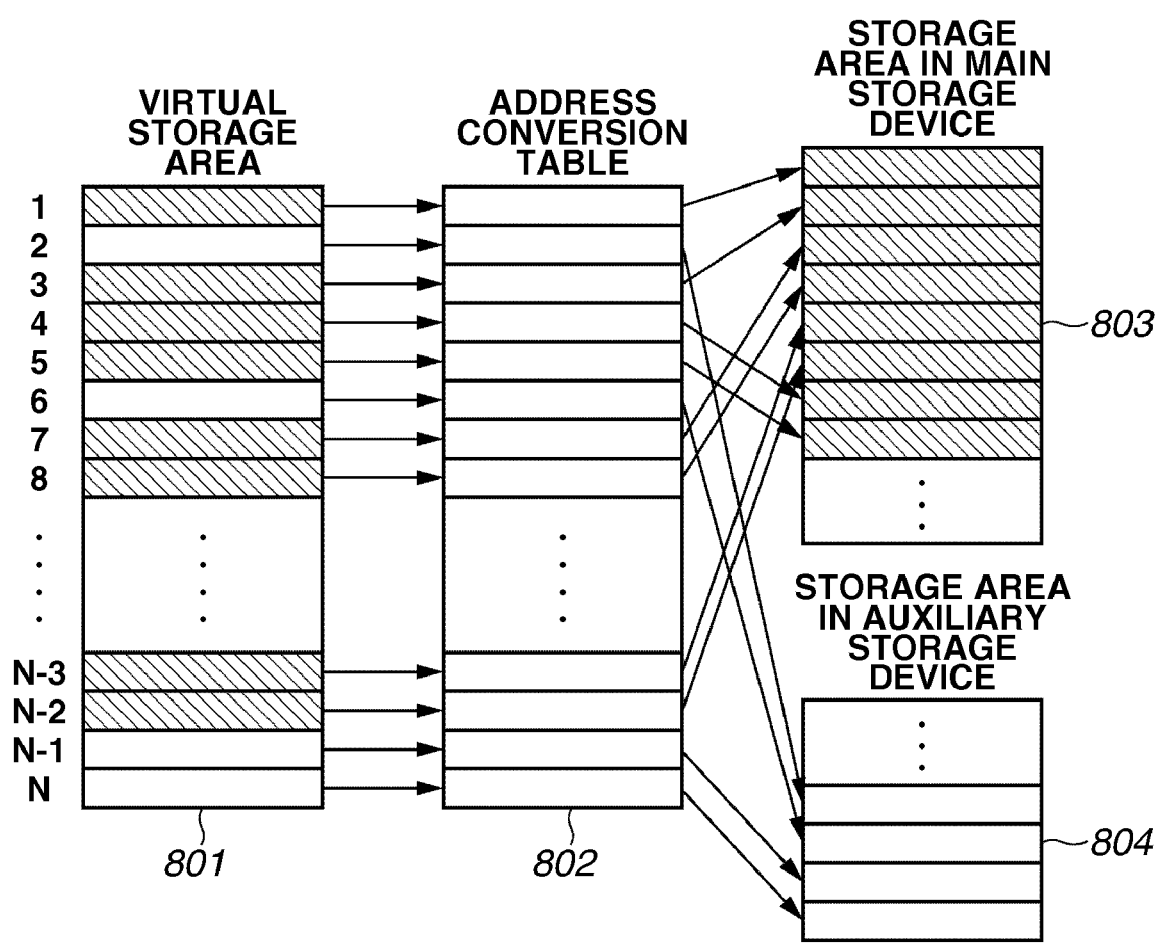
FIG. 8 illustrates a virtual storage area, a storage area of a main storage device, a storage area of an auxiliary storage device, and an address translation table.

Now, the initialization of the virtual storage area will be described referring to FIG. 8. FIG. 8 illustrates the virtual storage area, the storage area of the main storage device, the storage area of the auxiliary storage device, and the address translation table.

A virtual storage area 801 is a storage area used for concurrently executing a great number of application programs on the operating system of the information processing apparatus. The virtual storage area 801 includes the physical storage area 803 of the main storage device and the physical storage area 804 of the auxiliary storage device. In executing application programs, if a storage capacity necessary in executing the application programs is not reserved in the program execution area, the OS is unable to execute the application programs. Thus, the OS generates an address translation table 802 by which the OS can use the physical storage area 804 of the auxiliary storage device as well as the physical storage area 803 of the main storage device as the program execution area. The address translation table 802 is stored in the SDRAM 2002. Further, according to the present exemplary embodiment, the main storage device is the SDRAM 2002 and the auxiliary storage device is the HDD 2004.

As the execution area of the application programs, the OS reserves a number N (1 through N) of pages. The pages are, for example, 4 K bytes in size. To be more precise, the OS allocates the N number of pages in both the physical storage area 803 in the SDRAM 2002 and the physical storage area 804 in the auxiliary storage device. The allocation is based on the address translation table 802. The address translation table 802 includes information about mapping between a page in the virtual storage area 801 and a page in the main storage device or the auxiliary storage device.

The OS executes the application programs based on the premise that the N-pages of the program execution area that have been allocated for the virtual storage area 801 are reserved. On the other hand, if a page in the virtual storage area 801 is accessed by one of the application programs, the OS determines whether that page physically exists in the main storage device or in the auxiliary storage device. According to the determination, if the accessed page exists in the physical storage area 803 of the main storage device, then the OS executes the application program using the corresponding storage area of the main storage device. On the other hand, if the accessed page exists in the physical storage area 804 of the auxiliary storage device, then the OS searches for a free page (e.g., a page without data) of the main storage device, and loads data from the storage area of the auxiliary storage device into the page that has been searched and executes the program.

By generating a table such as the address translation table described above, the OS can seemingly increase the storage capacity which is reserved by the OS as the program execution area. The pages marked with diagonal lines in FIG. 8 physically exist in the main storage device. Further, according to the present exemplary embodiment, in order to make the applications A through E concurrently executable by the OS, 512 MB of the main storage device and 1 GB of the auxiliary storage device are allocated for the virtual storage area 801. Furthermore, the storage area of the 1 GB allocated for the virtual storage area 801 from the physical storage area of the auxiliary storage device is preferably one partition allocated for the virtual storage area.

Now, returning to FIG. 2, after the CPU 2001 performs initialization (generation of the address translation table) of the virtual storage area 801 in step S209, the process proceeds to step S210. The initialization of the virtual storage area 801 is executed after step S208. In other words, the OS allocates the physical storage area 804 of the HDD 2004 as the program execution area after the application programs having the start-up setting of "1" are loaded into the program execution area.

In step S210, the OS starts the application programs having the start-up setting of "2" (i.e. the application programs A and B according to the table in FIG. 4). To be more precise, the OS loads the application programs A and B stored in the HDD 2004 into the SDRAM 2002. At this time, the CPU 2001 that executes the OS functions as a loading unit that loads the application programs into the program execution area. As described above, a memory capacity of 1.5 GB (512 MB+1 GB) is allocated for the virtual storage area in step S209. Thus, even if the OS starts the application programs A and B in addition to the already started application programs C through E, a program execution area that is sufficient for executing the application programs is reserved in the virtual storage area 801. Accordingly, the OS executes the application programs A through E using the virtual storage area 801.

When step S210 ends, the OS determines that the processing at the time of starting the information processing apparatus is finished, and starts the normal operation for executing the applications A through E.

Next, processing executed by the OS when the memory capacity of the program execution area in the SDRAM 2002 is determined as not larger than the necessary storage capacity (NO in step S206) will be described.

In this case, since the program execution area which the OS needs in starting and executing the application programs is not reserved, the program execution area needs to be increased. Thus, in step S211, the OS performs initialization of the virtual storage area 801 described above in step S209.

In step S213, the OS starts the application programs having the start-up setting of "1" and the application programs having the start-up setting of "2". To be more precise, the OS loads the application programs A through E stored in the HDD 2004 into the SDRAM 2002. At this time, the CPU 2001 that executes the OS, functions as a loading unit that loads the application program into the program execution area. Since a memory capacity of 1.5 GB is already allocated for the virtual storage area 801 in step S213, even if the OS starts the application programs A through E, there is enough program execution area in the virtual storage area 801. Thus, the OS executes the application programs A through E using the virtual storage area 801. The OS starts the application programs having the start-up setting of "1" before starting the application programs having the start-up setting of "2".

When step S213 ends, the OS determines that the processing at the time of starting the information processing apparatus is completed, and starts the normal operation for executing the applications A through E.

As described above, according to the present exemplary embodiment, a plurality of application programs can be concurrently executed regardless of a storage capacity of a main storage device in an information processing apparatus. In addition, standby time of the information processing apparatus can be reduced. The standby time is time from when the information processing apparatus is activated, to when the apparatus becomes capable of executing a particular application program. Further, according to the present exemplary embodiment, "the storage capacity of the main storage device" is a storage capacity that can be reserved in the SDRAM 2002 for a program execution area. In the present exemplary embodiment, the particular application programs are programs in the application setting table in FIG. 4 and having the start-up setting of "1".

The particular application programs are not limited to the application programs in FIG. 4 and various types of start-up setting can be set. For example, only the application program E can be set to have the start-up setting of "1" and the application programs A through D can be set to have the start-up setting of "2". In this case, the application program that is started before the initialization of the virtual storage area will be only the application program E and thus the input performed by the operator of the information processing apparatus using the operation unit can be started quickly. Thus, wait time of the information processing apparatus can be reduced. The wait time is time from when the operator of the information processing apparatus started up the information processing apparatus, to when the operator becomes capable of performing some kind of operation. The scanning or printing condition which is input via the operation unit is stored, for example, in the SDRAM 2002. When the scanning function execution program or the print function execution program is started, the setting condition can be used.

Further, according to the present exemplary embodiment, an application program having a start-up setting of "1" is started in step S208 after the storage capacity is determined to be larger than the storage capacity necessary in executing the application program in step S206 (YES in step S206). The virtual storage area is initialized when the start-up is completed. However, the present invention is not limited to such an example. For example, the initialization of the virtual storage area can be started as instructed by the OS to execute an application program having a start-up setting of "2".

Next, a second exemplary embodiment of the present invention will be described.

In the first exemplary embodiment, the processing at the time of starting the information processing apparatus has been described. According to the second exemplary embodiment, after the information processing apparatus is started, the apparatus is switched to a power-saving mode, and then switched to a normal mode back again. When the information processing apparatus is switched to the power-saving mode, power supplied to some of the devices included in the information processing apparatus is stopped.

According to the present exemplary embodiment, the information processing apparatus operates in a plurality of power modes each having different power consumption. The information processing apparatus at least operates in the power-saving mode with small power consumption and the normal mode with power consumption that is higher than that of the power-saving mode. When the information processing apparatus is in the power-saving mode, the information processing apparatus stops a part (or whole) of the power supply to the scanner 2070 and the printer 2095.

Additionally, when the information processing apparatus is in the power-saving mode, in the CU 2000, a part (or whole) of the power supply to the operation unit I/F unit 2006, the network unit 2010, the modem unit 2050, the HDD 2004, the RIP unit 2060, and the device I/F unit 2020 is stopped. Furthermore, when the information processing apparatus is in the power-saving mode, a part (or whole) of the power supplied to the scanner image processing unit 2080, the image rotation unit 2030, and the image compression unit 2040 is stopped.

When the information processing apparatus is in the normal mode, power is supplied to each unit to which the supply of power has been stopped in the power-saving mode.

Further, when the information processing apparatus is in the normal mode, the apparatus is in an operation state in which image processing of the image data sent from an external apparatus and received via the network unit 2010 or the modem unit 2050, and also image forming processing of the image-processed image data by the printer 2095 can be performed.

Although, a part (or whole) of the power supplied to units other than the CPU 2001 included in the CU 2000 is stopped in the above-described power-saving mode, power consumption can further be reduced by stopping the power supply to the CPU 2001.

However, if the information processing apparatus is in the power-saving mode and the power supply to the CPU 2001 is stopped, when the information processing apparatus returns to the normal mode from the power-saving mode, the power supply to the CPU 2001 needs to be restarted again. After then, the CPU 2001 executes initialization of each unit included in the CU 2000.

Next, a case will be described where power supply to the CPU 2001, as well as other units included in the CU 2000, is stopped when the information processing apparatus is in the power-saving mode.

Figure 5:
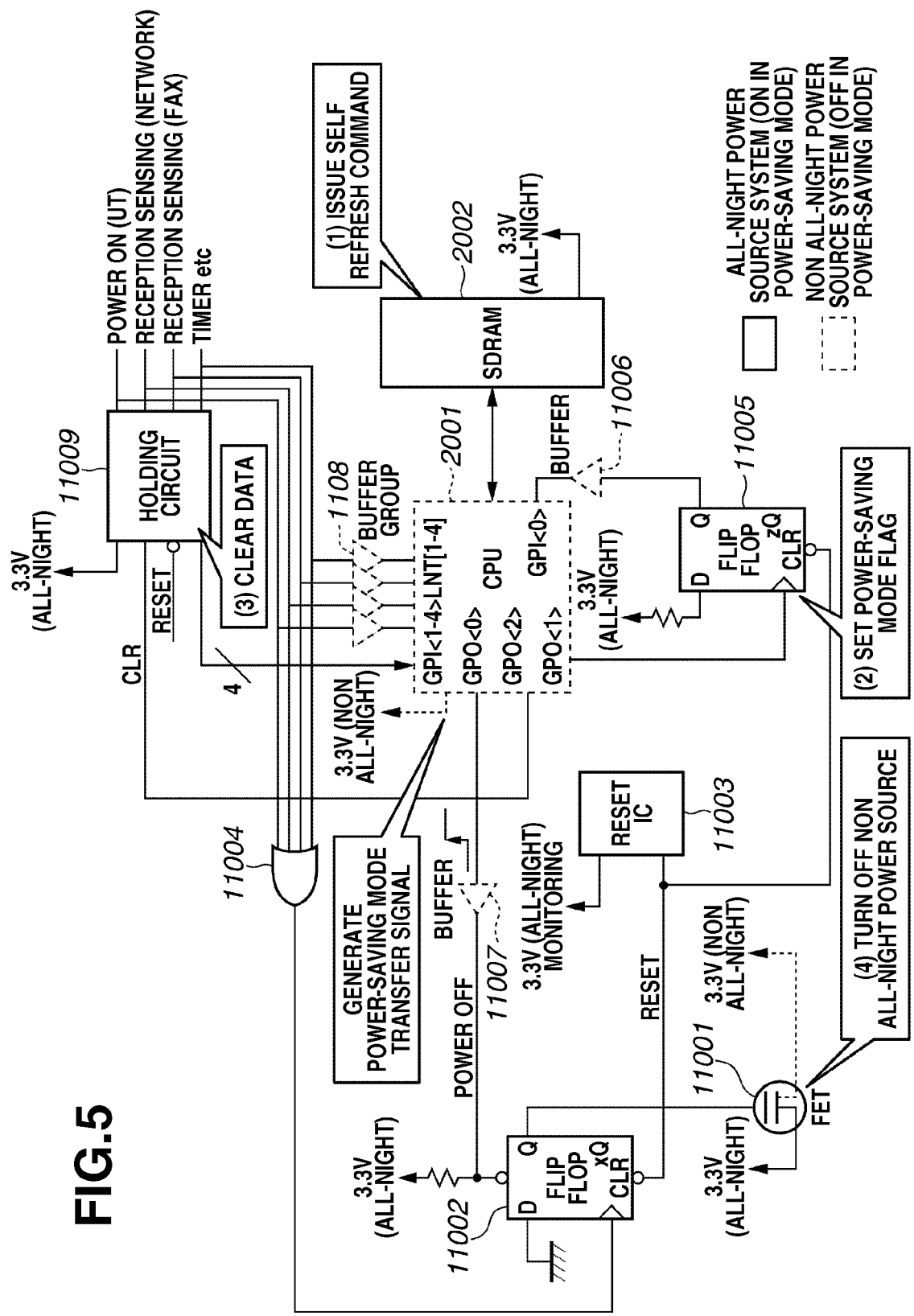
FIG. 5 is a circuit diagram illustrating a configuration of a power source control unit when the information processing apparatus is switched from the normal mode to the power-saving mode.
Figure 6:
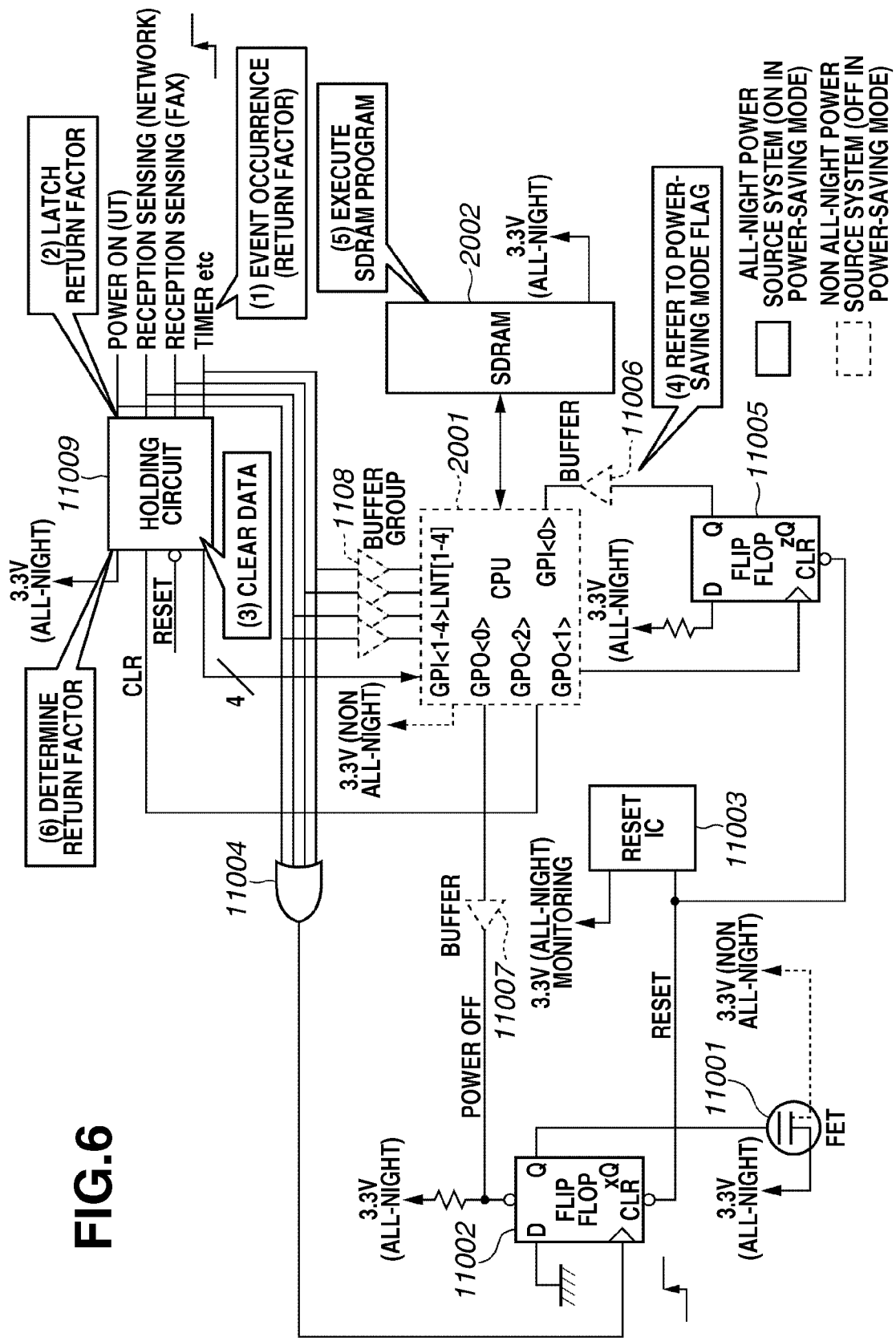
FIG. 6 is a circuit diagram illustrating a configuration of the power source control unit when the information processing apparatus returns to the normal mode from the power-saving mode.

FIGS. 5 and 6 are circuit diagrams illustrating configuration of the power source control unit 2052 in the CU 2000 illustrated in FIG. 1. Components illustrated in FIGS. 5 and 6 which are similar to those illustrated in FIG. 1, are given the same reference numerals. FIG. 5 illustrates the power source control unit 2052 when the information processing apparatus is switched from the normal mode to the power-saving mode. FIG. 6 illustrates the power source control unit 2052 when the information processing apparatus returns to the normal mode from the power-saving mode. In FIGS. 5 and 6, the areas shown by broken lines are portions included in a main power source system. When the information processing apparatus is in the print mode, power is supplied from the power source control unit 2052 to the main power source system shown by broken lines. However, when the information processing apparatus is in the power-saving mode, power is not supplied to such system. The areas shown by solid lines are portions included in a sub power source system. Power is supplied to these areas in the power-saving mode as well as in the normal mode.

In FIG. 5, a Q output of a flip flop (FF) 11002 is applied to agate side of a field-effect transistor (FET) 11001. The auxiliary power source system and the main power source system are separated according to a state of the Q output. If the auxiliary power source system and the main power source system are separated and the information processing apparatus is switched to the power-saving mode, power supply to portions other than main portions of the CU 2000 (portions necessary in operating multifunction apparatuses 1001 and 1020 in the power-saving mode) is stopped. In this way, useless standby power can be reduced.

The SDRAM 2002 and the ROM 2003 illustrated in FIG. 1 are included in the auxiliary power source system. The CPU 2001, the image bus I/F unit 2005, the RIP unit 2060, the device I/F unit 2020, the scanner image processing unit 2080, the printer image processing unit 2090, the image rotation unit 2030, and the image compression unit 2040 are included in the main power source system. The HDD 2004 is also included in the main power source system, however, power to the HDD 2004 can be turned on/off independent of the main power source system to which the CPU 2001 is connected. In other words, even if power is supplied to the CPU 2001, the HDD 2004 can be turned off.

Further, some of the operation unit I/F unit 2006, the network unit 2010, and the modem unit 2050 is included in the main power source system and the rest is included in the auxiliary power source system.

The network unit 2010 and the modem unit 2050 are in a state unable to receive image data input via the LAN 2011 or the WAN 2051 when the information processing apparatus is operating in the power-saving mode.

On the other hand, the network unit 2010 and the modem unit 2050 can receive a request, which is input via the LAN 2011 or the WAN 2051, that causes the information processing apparatus to return to the normal mode from the power-saving mode.

A holding circuit 11009 is included in the auxiliary power source system and can accept a first through a fourth requests for cancelling the power-saving mode even when the information processing apparatus is in the power-saving mode. The first through the fourth requests are input to a clock input terminal of the FF 11002 via a logic OR gate 11004. The first through the fourth requests, which cause the information processing apparatus to return to the power-saving mode from the power-saving mode, are input to the CPU 2001 via a buffer group 11008.

The first through the fourth requests are held by the holding circuit 11009 as, for example, data of 4 bits. When the information processing apparatus returns to the normal mode from the power-saving mode, if a flag set in a FF 11005 is "1", the CPU 2001 reads the 4-bit of data. Then, referring to a bit determination table which has been prepared for mapping in advance, contents of the first through the fourth requests can be assessed.

According to the present exemplary embodiment, the first request corresponds to a power-on instruction which is input by a user of a multifunction peripheral using the operation unit 2012 via the operation unit I/F unit 2006. The power-on instruction is an instruction for switching an operation state of the information processing apparatus, which is operating in the power-saving mode, to the normal mode (operational status).

The second request corresponds to the power-on instruction when a request for receiving image data (Page Description Language data, i.e., PDL data) is sent from an external apparatus via the network unit 2010. Further, the third request corresponds to the power-on instruction when a request for receiving image data (facsimile data) is sent from an external apparatus via the modem unit 2050. Furthermore, the fourth request corresponds to the power-on instruction which is issued at a time set by a timer (not shown).

The FF 11005, which is included in the auxiliary power source system, stores a flag that is generated according to a change in a general-purpose output port GPO<1> of the CPU 2001 from "L" to "H" even after the information processing apparatus is switched to the power-saving mode from the normal mode.

Further, when a reset signal is output from a reset IC 11003, which is included in the auxiliary power source system, and input to a clear terminal (CLR) of the FF 11005, a signal that indicates resetting is output from the Q output of the FF 11005 and input to a general-purpose input port GPI<0> of the CPU 2001 via a buffer 11006.

The reset IC 11003 is included in the auxiliary power source system. The reset IC 11003 outputs the reset signal to the FF 11002 which is included in the auxiliary sub power source system. A buffer 11007 outputs a power-off signal to the FF 11002.

The buffer group 11008, the buffer 11007, and the buffer 11006, which are included in the main power source system, prevent a current from flowing into the CPU 2001 when the information processing apparatus is switched from the print mode to the power-saving mode.

Further, the reset IC 11003 monitors the auxiliary power source system. At the time of starting the information processing apparatus after the main power source is turned off, as described below, the reset IC 11003 clears the flag of the FF 11005 and latch data in the holding circuit 11009. The logic OR gate 11004 collectively acquires factors by which the information processing apparatus returns from the power-saving mode.

The CPU 2001 generally requires a larger amount of power compared to other units included in the controller unit 2000. According to the present exemplary embodiment, the CPU 2001 is included in the main power source system. When the information processing apparatus is in the power-saving mode, power is not supplied to the CPU 2001.

The information processing apparatus operates in at least two modes, i.e., the power-saving mode and the normal mode. The holding circuit 11009 holds information indicating which factor was input among factors which cause shift from the power-saving mode to the normal mode in the information processing apparatus. In addition to the power-saving mode, a plurality of modes with different power consumption can further be added.

Figure 7:
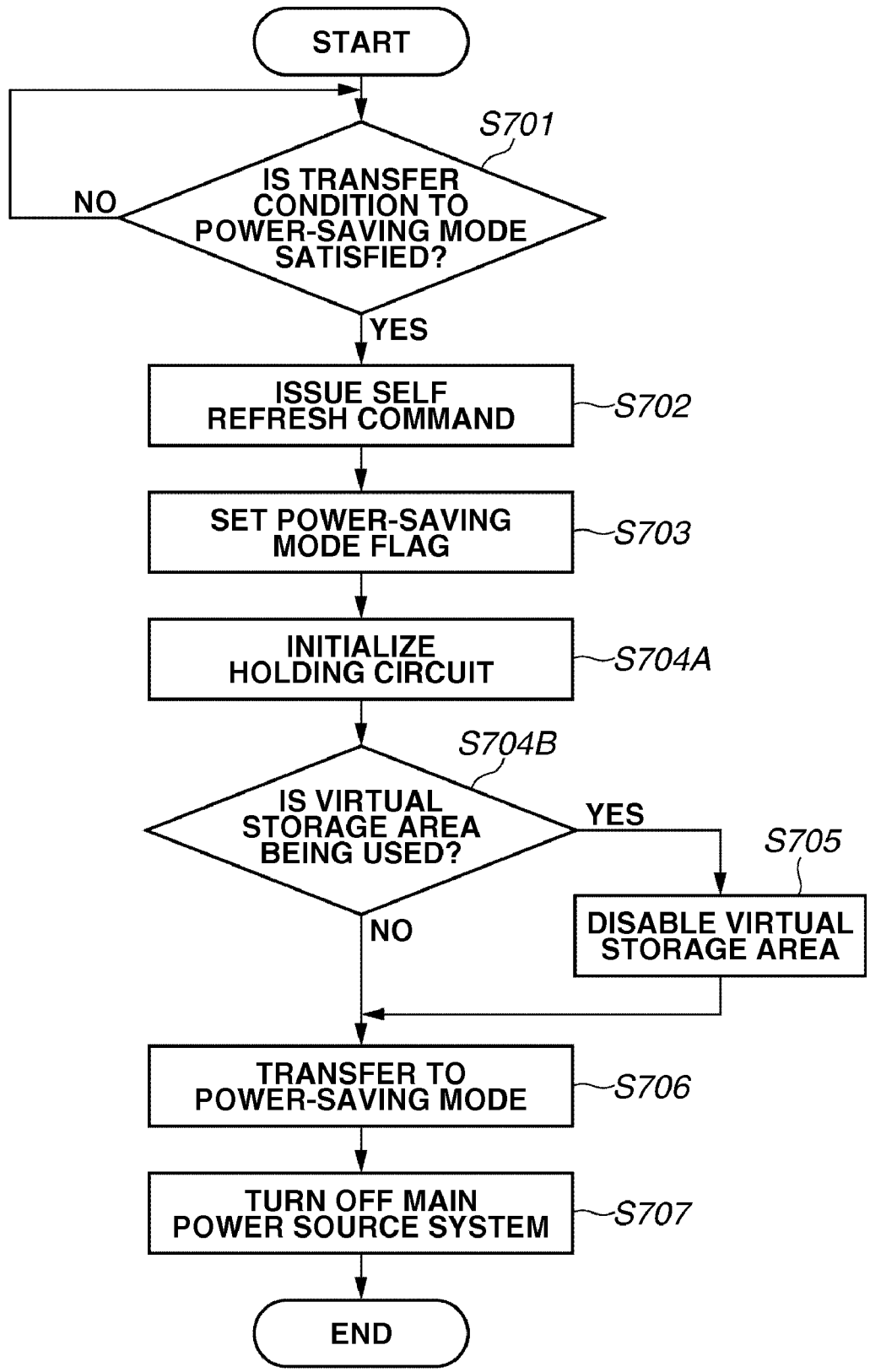
FIG. 7 is a flowchart illustrating processes for switching the information processing apparatus from a normal mode to a power-saving mode.

Now, referring to the flowchart illustrated in FIG. 7, the processing of the information processing apparatus that is switched from the normal mode to the power-saving mode will be described. Each step in FIG. 7 is executed by the CPU 2001 executing a program loaded into the SDRAM 2002 from the HDD 2004.

First, in step S701, the CPU 2001 determines whether a condition necessary in switching the information processing apparatus from the normal mode to the power-saving mode is satisfied. If the CPU 2001 determines that the condition is satisfied (YES in step S701), then the process proceeds to step S702. The condition is satisfied when the operator of the information processing apparatus presses a power-saving key (not shown) in the operation unit 2012 to switch the mode to the power-saving mode or when the information processing apparatus is idle for a certain period of time without processing any data.

In step S702, the CPU 2001 issues a self-refresh command to the SDRAM 2002 and makes a setting so that programs stored in the SDRAM 2002 can remain stored in the SDRAM 2002 ((1) in FIG. 5). At least the OS is included in the programs stored in the SDRAM 2002.

Next, in step S703, the CPU 2001 changes the state of the general-purpose output port GPO<1> of the FF 11005 from "L" to "H", so that information that the information processing apparatus has been switched to the power-saving mode is stored in the FF 11005. Then, the CPU 2001 sets a power-saving mode flag (output of the FF 11005 is "1") ((2) in FIG. 5). Since the FF 11005 is included in the auxiliary power source system, the value of the flag is stored even after the information processing apparatus is switched to the power-saving mode.

Next, in step S704A, the CPU 2001 clears the data latched by the holding circuit by changing a general-purpose output port GPO<2> of the holding circuit 11009 and initializing the holding circuit 11009 ((3) in FIG. 5).

Next, in step S704B, the OS executed by the CPU 2001 determines whether the virtual storage area 801 is being used by the information processing apparatus. The OS determines whether the virtual storage area 801 is being used by executing a particular command (e.g., free command in Linux). If the virtual storage area 801 is being used (YES in step S704B), then the process proceeds to step S705. If the virtual storage area 801 is not being used (NO in step S704B), then the process proceeds to step S706.

In step S705, the OS executed by the CPU 2001 disables the virtual storage area 801. To be more precise, the OS deletes the address translation table 802 and allocates the program execution area of the OS in the physical storage area 803 of the SDRAM 2002.

In step S706, the OS executes transfer processing by which the information processing apparatus is switched to the power-saving mode. For example, the OS executes processing that closes the application program. The OS loaded into the SDRAM 2002 from the HDD 2004 is continuously stored in the SDRAM 2002 even if the information processing apparatus is switched to the power-saving mode.

Next, in step S707, the CPU 2001 presets a general-purpose output port GPO<0> of the FF 11002 to "H". Since the Q output of the FF 11002 is changed to "L" according to this process, the FET 11001 is switched to the off state. Accordingly, the main power source system that includes the CPU 2001 is turned off and the information processing apparatus is switched to the power-saving mode.

The buffer group 11008, the buffer 11007, and the buffer 11006 in FIG. 5, which are driven by the main power source system, prevent a current from flowing from the auxiliary power source system when the information processing apparatus is switched to the power-saving mode.

Further, the reset IC 11003 monitors the auxiliary power source system. At the time of starting the information processing apparatus after the main power source is turned off, the reset IC 11003 clears the flag in the FF 11005 and the data latched by the holding circuit 11009. The logic OR gate 11004 collectively acquires factors by which the information processing apparatus returns to the print mode from the power-saving mode. If any one of the possible factors is detected, a return request is input to the clock input of the FF 11002.

Next, a return process from the power-saving mode to the normal mode will be described referring to the flowchart in FIG. 9.

Figure 9:
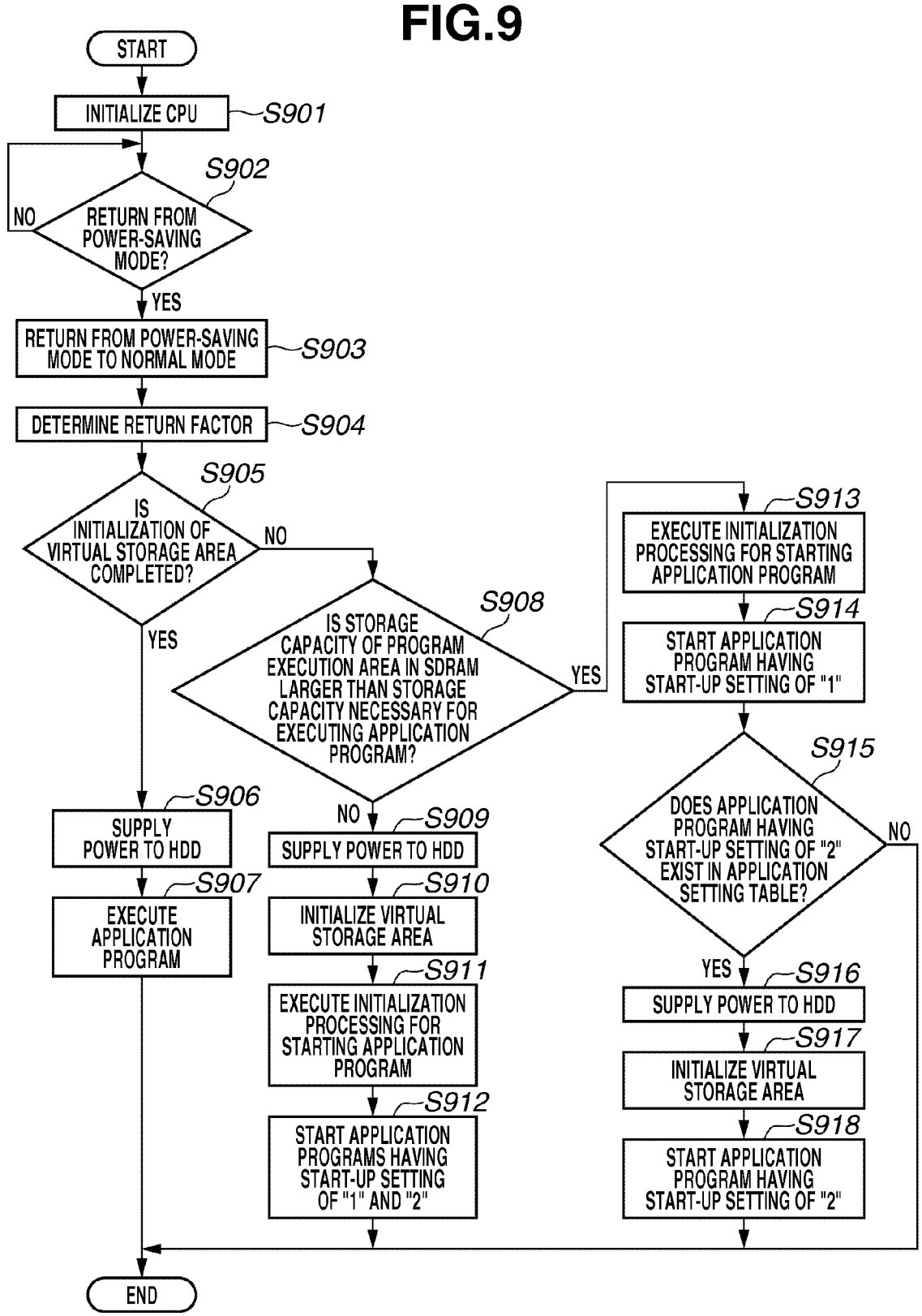
FIG. 9 is a flowchart illustrating processes for switching the information processing from the power-saving mode to the normal mode.

The flowchart in FIG. 9 illustrates processes used for switching the information processing apparatus from the power-saving mode to the normal mode. FIG. 10 is a timing chart illustrating details of processes executed by the CPU 2001, which operates according to the flowchart illustrated in FIG. 9, based on time. The flow of processing of the CU 2000 at the time of starting the information processing apparatus will now be described referring to FIGS. 9 and 10.

The processes of the flowchart in FIG. 9 are realized by the CPU 2001 reading out a program stored in the SDRAM and executing it. The processing is started in the case described below.

First, when the information processing apparatus is operating in the power-saving mode, a factor by which the information processing apparatus returns to the print mode from the power-saving mode is input. This factor is one of the first through the fourth requests. When the factor is input, the holding circuit 11009 latches the signal that has been input so that the data can be read when the CPU 2001 returns. The data latched by the holding circuit 11009 is stored until the main power source (not shown) of the information processing apparatus is turned off or a clear signal (clr) is sent from the CPU 2001 to the holding circuit 11009.

The return factor that is input in the holding circuit 11009 is also sent to the FF 11002 via the logic OR gate 11004. Accordingly, if a factor by which the information processing apparatus returns to the normal mode from the power-saving mode occurs, then a clock edge is applied to the FF 11002, the FET 11001 is turned on, the main power source system starts, and the return processing from the power-saving mode to the normal mode starts. At this time, power is supplied to the main power source system in which the CPU 2001 is included, however power is not supplied to the HDD 2004. Whether power is to be supplied to the HDD 2004 depends on a determination made by the CPU 2001 and instructed to the power source control unit 2052.

In step S901, the CPU 2001 loads the BIOS from the ROM 2003 into the SDRAM 2002. Then, initialization of the CPU 2001 is started. When the initialization is completed, the CPU 2001 refers to a value of the flag stored in the FF 11005 via the general-purpose output port GPI<0>.

In step S902, the CPU 2001 determines whether the information processing apparatus has returned from the power-saving mode according to the flag stored in the FF 11005. Since the value of the flag stored in the FF 11005 is "1" if the information processing apparatus has returned from the power-saving mode, the CPU 2001 can determine whether the information processing apparatus has returned from the power-saving mode according to the value of the flag. If the CPU 2001 determines that the information processing apparatus has returned from the power-saving mode (YES in step S902), then the process proceeds to step S903.

In step S903, the CPU 2001 executes a program which serves as a basis of a start-up sequence. The program is stored in the SDRAM 2002. According to the execution of this program, the OS as well as each device included in the CU 2000 and managed by the OS returns to the normal mode from the power-saving mode. The OS is already activated at the time of starting the information processing apparatus and the OS is stored in the SDRAM 2002 at the time the information processing apparatus returns to the normal mode from the power-saving mode. The value of the flag stored in the FF 11005 is "0" if the main power source of the information processing apparatus has been turned on and the information processing apparatus is not in a status that it has returned to the current mode from the power-saving mode. Accordingly, the CPU 2001 determines that the main power supply has been turned on.

In step S904, the CPU 2001 reads the return factor latched by the holding circuit 11009 and determines which of the first through fourth requests has occurred as a return factor.

In step S905, the OS determines whether the initialization of the virtual storage area 801 is completed. If the initialization is completed (YES in step S905), then the process proceeds to step S906. If the initialization is not completed (NO in step S905), then the process proceeds to step S908. The OS determines whether the initialization of the virtual storage area 801 is completed by executing a particular command (e.g., free command in Linux).

In step S906, the CPU 2001 sends a command to the power source control unit 2052 so that power is supplied to the HDD 2004. This command is issued so as to execute the application program using the virtual storage area 801 as the program execution area since the initialization of the virtual storage area 801 is completed. When the power source control unit 2052 receives the command sent from the CPU 2001, the power source control unit 2052 makes control so that power is supplied to the HDD 2004.

In step S907, the OS executes the application program using the virtual storage area 801 as the program execution area. Since a state of the information processing apparatus before the mode of the apparatus is switched to the power-saving mode is stored in the HDD 2004, restarting the application program is not necessary.

In step S908, the OS determines whether the storage capacity of the program execution area of the SDRAM 2002 is larger than the capacity necessary in executing the application program. Since step S908 is similar to step S206 in FIG. 2 of the first exemplary embodiment, detailed descriptions on this step shall be omitted. If the storage capacity of the program execution area is larger than the capacity necessary in executing the application (YES in step S908), then the process proceeds to steps S913, S914, s917 and S918. Since steps S913, S914, s917 and S918 are similar to steps S207 through S210 in FIG. 2, detailed descriptions on these steps shall be omitted.

In step S915, the OS refers to the application setting table and determines whether an application program having the start-up setting of "2" exists in the table. If an application program having the start-up setting of "2" does not exist in the table (NO in step S915), then the process ends. In this case, since the OS does not supply power to the HDD 2004, if the transfer condition to the power-saving mode described in step S701 of FIG. 7 is satisfied again, the information processing apparatus is switched to the power-saving mode without supplying power again to the HDD 2004. On the other hand, if an application program having the start-up setting of "2" exists in the table (YES in step S915), then the process proceeds to step S916.

In step S916, the CPU 2001 sends a command to the power source control unit 2052 so that power is supplied to the HDD 2004. When the power source control unit 2052 receives the command sent from the CPU 2001, the power source control unit 2052 makes control so that power is supplied to the HDD 2004.

In step S908, if the storage capacity of the program execution area is not larger than the capacity necessary in executing the application (NO in step S908), then the process proceeds to steps S909. In step S909, the CPU 2001 sends a command to the power source control unit 2052 so that power is supplied to the HDD 2004. When the power source control unit 2052 receives the command sent from the CPU 2001, the power source control unit 2052 makes control so that power is supplied to the HDD 2004. After step S909, the process proceeds to steps S910 through S912. Since steps S910 through 912 are similar to steps S211 through S213 in FIG. 2, detailed descriptions of the steps shall be omitted.

When step S907, S912, or S918 ends, the OS determines that the return processing of the information processing apparatus to the normal mode is completed, and starts the normal operation for executing the applications A through E.

According to the present exemplary embodiment, concurrent execution of a plurality of application programs can be performed regardless of a storage capacity of a main storage device in an information processing apparatus. Further, standby time of the information processing apparatus can be shortened. The standby time is time from when the information processing apparatus starts a process for returning the apparatus from the power-saving mode to the normal mode, to when the information processing apparatus becomes capable of executing a particular application program. Further, according to the present exemplary embodiment, "the storage capacity of the main storage device" is a capacity that can be reserved in the SDRAM 2002 as a program execution area. Further, the particular application programs are those set in the application setting table in FIG. 4 as having the start-up setting of "1".

The particular application programs are not limited to the application programs in FIG. 4 and various types of start-up setting can be set. For example, only the application program E can be set to have the start-up setting of "1" and the application programs A through D can be set to have the start-up setting of "2". In this case, the application program that is started before the initialization of the virtual storage area will be only the application program E and thus input performed by the operator of the information processing apparatus using the operation unit can be started quickly. Thus, wait time of the information processing apparatus can be reduced. The wait time is time from when the operator of the information processing apparatus started up the information processing apparatus, to when the operator becomes capable of performing some kind of operation. The scanning or printing condition which is input via the operation unit is stored, for example, in the SDRAM 2002. When the scanning function execution program or the print function execution program is started, the setting condition can be used.

Further, if the HDD 2004 is not necessary when the information processing apparatus returns from the power-saving mode (i.e., the capacity of the program execution area of the SDRAM is larger than the capacity necessary in executing the application program), operation can be performed in the normal mode without supplying power to the HDD 2004. If a number of switching operation that turns on/off the HDD 2004 increases, possibility of malfunction also increases. According to the present exemplary embodiment, since the HDD is not turned on when the HDD is unnecessary, the life of the HDD can be increased. Further, when the turned-off HDD is turned on so that data can be read from the HDD, spin-up processing is necessary to raise a number of revolutions of a magnetic disk included in the HDD to a constant number. This spin-up processing takes time and causes the information processing apparatus to take time when it returns from the power-saving mode. According to the present exemplary embodiment, since power is not supplied to the HDD if the HDD is unnecessary, delay in return time due to the spin-up processing of the HDD can be eliminated.

Further, if the storage capacity of the program execution area in the SDRAM 2002 is larger than the capacity necessary in executing an application program (YES in step S908), an effect described below can be obtained. More specifically, if an application program having the start-up setting of "2" does not exist (NO in step S915), then an application program having the start-up setting of "1" can be executed without starting the HDD 2004. In other words, if a certain condition is satisfied, since an application program can be executed without starting the HDD 2004, reduction of life caused by frequent turning on/off of the HDD 2004 can be prevented.

The present invention can also be realized by supplying a storage medium storing a software program code which realizes a function of the above-described embodiments to a control system or an apparatus. Thus, the object of the above-described embodiments can be also achieved when a computer of the system or the apparatus reads and executes the program code stored in such a computer-readable storage medium. In this case, the program code itself read out from the storage medium realizes the functions described in the above-described embodiments. Thus, the storage medium which stores the program code constitutes the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-062782 filed Mar. 12, 2008, which is hereby incorporated by reference herein in its entirety.

What is claimed is:

1. An information processing apparatus capable of executing a plurality of application programs that run on an operating system, comprising:
a first storage unit including a first storage area;
a second storage unit including a second storage area, the second storage unit being separated from the first storage unit, and access speed of the second storage unit being slower than access speed of the first storage unit;
a determination unit configured to determine, for each of the plurality of application programs, whether the application program is a first application program or a second application program, the first application program being needed to be executed early, the second application program being not needed to be executed early;
a first initialization unit configured to initialize the first storage area for the first application program if the capacity of the first storage area is larger than the capacity needed by the first application program;
a first loading unit configured to load the first application program into the first storage area initialized by the initialization unit;
a first execution unit configured to execute the first application program loaded by the first loading unit;
a second initialization unit configured to initialize the second storage area for the second application program, after the first initialization unit initializes the first storage area for the first application program, if the capacity of the first storage area is larger than the capacity needed by the first application program, and to initialize the second storage area for the first application program and the second application program if the capacity of the first storage area is not larger than the capacity needed by the first application program;
a second loading unit configured to load the first application program or the second application program into the second storage area initialized by the second initialization unit; and
a second execution unit configured to execute the first application program or the second application program loaded by the second loading unit.

2. The information processing apparatus according to claim 1, wherein the second storage unit stores the operating system and the plurality of application programs.

3. The information processing apparatus according to claim 1, wherein the second storage area is allocated as one partition.

4. The information processing apparatus according to claim 1, further comprising:
a judging unit configured to judge whether a capacity needed by the first application program is larger than a capacity of the first storage area.

5. The information processing apparatus according to claim 1, further comprising an operation unit, wherein the first application program is for controlling the operation unit.

6. The information processing apparatus according to claim 1, wherein a capacity of the second storage area is larger than the capacity of the first storage area.

7. The information processing apparatus according to claim 1,
wherein the first initialization unit initializes the first storage area by writing a predetermined value in the first storage area, and
wherein the second initialization unit initializes the second storage area by writing a predetermined value in the second storage area.

8. The information processing apparatus according to claim 1,
wherein the first initialization unit initializes the first storage area by allocating the first storage area for the first application program, and
wherein the second initialization unit initializes the second storage area by allocating the second storage area for the second application program.

9. An information processing method for an information processing apparatus capable of executing a plurality of application programs that run on an operating system, wherein the information processing apparatus includes a first storage unit having a first storage area and a second storage unit having a second storage area, the second storage unit being separated from the first storage unit, and access speed of the second storage unit being slower than access speed of the first storage unit, the method comprising:
via determining unit, determining for each of the plurality of application programs, whether an application program is a first application program or a second application program, the first application program being needed to be executed early, the second application program being not needed to be executed early:
via a first initialization unit, executing initialization of the first storage area for a the first application program if the capacity of the first storage area is larger than the capacity needed by the first application program;
via a first loading unit, loading the first application program into the first storage area initialized by the first initialization unit;
via a first execution unit, executing the first application program which is loaded by the first loading unit;

via a second initialization unit, executing initialization of the second storage area for the second application program, after the first initialization unit initializes the first storage area for the first application program, if the capacity of the first storage area is larger than the capacity needed by the first application program, and to initialize the second storage area for the first application program and the second application program if the capacity of the first storage area is not larger than the capacity needed by the first application program;

via a second loading unit, loading the first application program or the second application program initialized by the second initialization unit; and via a second execution unit, executing the first application program or the second application program which is loaded by the second loading unit.

10. A non-transitory computer readable medium containing computer- executable instructions for controlling an information processing apparatus capable of executing a plurality of application programs that run on an operating system, wherein the information processing apparatus includes a first capable storage unit having a first storage area and a second storage unit having a second storage area, the second storage unit being separated from the first storage unit, and access speed of the second storage unit being slower than access speed of the first storage unit, the medium comprising:

computer-executable instructions for determining for each of the plurality of application programs, whether an application program is a first application program or a second application program, the first application program being needed to be executed early, the second application program being not needed to be executed early;

computer-executable instructions for executing initialization, by a first initialization unit, of the first storage area for the first application program if the capacity of the first storage area is larger than the capacity needed by the first application program;

computer-executable instructions for loading, by a first loading unit, the first application program into the first storage area initialized by the first initialization unit;

computer-executable instructions for executing the first application program which is loaded by the first loading unit;

computer-executable instructions for executing initialization, by a second initialization unit, of the second storage area for the second application program, after the first initialization unit initializes the first storage area for the first application program, if the capacity of the first storage area is larger than the capacity needed by the first application program, and for executing initialization of the second storage area for the first application program and the second application program if the capacity of the first storage area is not larger than the capacity needed by the first application program;

computer-executable instructions for loading, by a second loading unit, the second application program initialized by the second initialization unit; and computer-executable instructions for executing the second application program which is loaded by the second loading unit.

* * * * *